United States Patent
Tsai et al.

(10) Patent No.: US 10,162,434 B1
(45) Date of Patent: Dec. 25, 2018

(54) MOUSE WITH INERTIA ROLLER MODULE

(71) Applicant: Primax Electronics Ltd., Taipei (TW)

(72) Inventors: Yung-Ming Tsai, Taipei (TW); Chun-Che Wu, Taipei (TW); Chun-Nan Su, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 15/830,680

(22) Filed: Dec. 4, 2017

(30) Foreign Application Priority Data

Sep. 1, 2017 (TW) .............................. 106130017 A

(51) Int. Cl.
  *A63F 13/24* (2014.01)
  *A63F 13/211* (2014.01)
  *G06F 3/0354* (2013.01)
  *G06F 3/0362* (2013.01)

(52) U.S. Cl.
  CPC ........ *G06F 3/03543* (2013.01); *A63F 13/211* (2014.09); *A63F 13/24* (2014.09); *G06F 3/0362* (2013.01)

(58) Field of Classification Search
  CPC .. G06F 3/03543; G06F 3/0362; A63F 13/211; A63F 13/24
  See application file for complete search history.

(56) References Cited

U.S. PATENT DOCUMENTS

| | | | | |
|---|---|---|---|---|
| 4,892,312 | A * | 1/1990 | Minemoto | G05G 1/10 250/231.14 |
| 5,313,230 | A * | 5/1994 | Venolia | G06F 3/0312 200/11 TW |
| 5,446,481 | A * | 8/1995 | Gillick | G06F 3/03543 345/157 |
| 5,530,455 | A * | 6/1996 | Gillick | G06F 3/0312 345/156 |
| 6,351,224 | B1 * | 2/2002 | Wang | G06F 3/0312 341/2 |
| 6,724,365 | B1 * | 4/2004 | Escamilla | G06F 1/1616 345/157 |
| 7,042,441 | B2 * | 5/2006 | Adams | G06F 3/0213 345/157 |
| 7,782,303 | B2 * | 8/2010 | Chou | G06F 3/0362 345/156 |
| 9,785,257 | B2 * | 10/2017 | Hadas | G06F 3/011 |
| 10,095,322 | B1 * | 10/2018 | Li | G06F 3/03543 |
| 2003/0006964 | A1 * | 1/2003 | Cheng | G06F 3/03543 345/163 |
| 2003/0094354 | A1 * | 5/2003 | Badarneh | G06F 3/0338 200/18 |

(Continued)

*Primary Examiner* — Chad M Dicke
(74) *Attorney, Agent, or Firm* — Kirton McConkie; Evan R. Witt

(57) ABSTRACT

A mouse includes the main body and the inertial roller module. The inertial roller module is installed in the main body. The inertial roller module includes a supporting bracket, a roller, a gear assembly and an encoding element. The roller is pivotally coupled to the supporting bracket. The gear assembly includes a first gear and a second gear. The first gear is connected with the roller. The first gear and the second gear are engaged with each other. The number of teeth in the first gear is larger than the number of teeth in the second gear. The encoding element is connected with the roller. Consequently, the time period of rotating the roller is increased.

8 Claims, 4 Drawing Sheets

(56) References Cited

U.S. PATENT DOCUMENTS

| | | | |
|---|---|---|---|
| 2004/0189606 A1* | 9/2004 | Powpong | G06F 3/03543 345/163 |
| 2009/0102817 A1* | 4/2009 | Bathiche | G06F 3/03543 345/184 |
| 2010/0060234 A1* | 3/2010 | Nacson | G06F 1/26 320/114 |
| 2013/0038431 A1* | 2/2013 | Springer | G06F 3/016 340/407.1 |
| 2015/0193022 A1* | 7/2015 | Zhong | G06F 3/03543 290/1 C |
| 2017/0192536 A1* | 7/2017 | Wang | G06F 3/03543 |
| 2017/0205900 A1* | 7/2017 | Su | F16H 25/2015 |
| 2018/0164901 A1* | 6/2018 | O'Mahony | G06F 3/04847 |

* cited by examiner

MOUSE WITH INERTIA ROLLER MODULE

FIELD OF THE INVENTION

The present invention relates to a mouse with an inertial roller module.

BACKGROUND OF THE INVENTION

As known, 3C products have become necessities in daily lives of most people. For example, working, watching movies or play games can be performed through computers or video game consoles. For operating a display screen of the computer or the video game console, the computer or the video game console is usually connected with an external keyboard or a mouse. Via the keyboard or the mouse, the user may operate the data of the computer or the video game console. For example, the user may rotate a roller of the mouse to scroll the data shown on the display screen.

A conventional mouse comprises a main body, a roller, a supporting bracket, a supporting shaft and an encoding element. The roller, the supporting frame, the supporting shaft and the encoding element are disposed within the main body. The roller is arranged between the supporting bracket and the encoding element. A first side of the supporting shaft is penetrated through the roller. A second side of the supporting shaft is penetrated through the supporting bracket. The side of the roller away from the supporting bracket is connected with the encoding element. While the roller is rotated, the encoding element is correspondingly rotated in response to the rotation of the roller. Consequently, the purpose of scrolling the content of the display screen is achieved.

However, the use of conventional mouse still has some drawbacks. For example, while the user plays an electronic game, it is necessary to continuously rotate the roller to operate the characters or selective items in the game. Alternatively, if the user intends to search data quickly from a great amount of data of the viewed document on the display screen, the user has to continuously rotate the roller to scroll the document data on the display screen. Since the roller has to be continuously rotated with the user's finger in the above situations, the conventional mouse is not user-friendly. Therefore, there is a need of providing an improved mouse so as to solve the drawbacks of the conventional technologies.

SUMMARY OF THE INVENTION

The present invention provides a mouse with an inertial roller module.

In accordance with an aspect of the present invention, there is provided a mouse with an inertial roller module. The mouse includes the main body and the inertial roller module. The inertial roller module is installed in the main body. The inertial roller module includes a supporting bracket, a roller, a gear assembly and an encoding element. The supporting bracket is fixed in the main body. The roller is pivotally coupled to the supporting bracket. The gear assembly is located beside a side of the supporting bracket that is away from the roller. The gear assembly includes a first gear and a second gear. The first gear is connected with the roller. The first gear is engaged with the second gear. The number of teeth in the first gear is larger than the number of teeth in the second gear. The encoding element located beside a side of the roller that is away from the supporting bracket and connected with the roller. Consequently, the time period of rotating the roller is extended.

In an embodiment, the inertial roller module further includes a supporting shaft. A first side of the supporting shaft is connected with the roller. A second side of the supporting shaft is penetrated through the supporting bracket and connected with the first gear. Consequently, the roller is connected with the first gear through the supporting shaft. Preferably, the gear assembly further includes a third gear and a fourth gear. A side of the third gear is connected with an end of the supporting shaft that is away from the roller. The fourth gear is connected with the first gear and arranged between the supporting bracket and the first gear. The roller is connected with the first gear through engagement between the third gear and the fourth gear. Preferably, the gear assembly further includes a first connection shaft. Moreover, two ends of the first connection shaft are fixed on the main body. The first connection shaft is penetrated through the first gear and the fourth gear. Consequently, the first gear and the fourth gear are connected with each other through the first connection shaft. Preferably, the number of teeth in the fourth gear is smaller than the number of teeth in the first gear and the number of teeth in the third gear. Preferably, the inertial roller module further includes a roller sensor. The roller sensor is located under the third gear. A gear surface of the third gear is in contact with the roller sensor. Preferably, the inertial roller module further includes an inertial rotator. The inertial rotator is arranged between the second gear and the roller. The inertial rotator is connected with the second gear. Preferably, the gear assembly further includes a second connection shaft. Moreover, two ends of the second connection shaft are fixed on the main body. The second connection shaft is penetrated through the second gear and the inertial rotator. Consequently, the second gear and the inertial rotator are connected with each other through the second connection shaft. Since the moment of inertial of the inertial rotator is increased, the time period of rotating the roller is extended.

In an embodiment, the inertial roller module further includes a clicking-feel generation mechanism. The clicking-feel generation mechanism includes a ratchet, a press rod and an elastic element. The second connection shaft is penetrated through the ratchet. The ratchet is arranged between the second gear and the inertial rotator. The press rod is located under the ratchet and engaged with the ratchet. An end of the press rod is pivotally coupled to the main body. The elastic element is located under the press rod. An end of the elastic element that is away from the press rod is fixed on the main body. The press rod is contacted with the elastic element. Consequently, the rotation of the roller results in continuous clicking feel.

In an embodiment, the inertial roller module further includes a belt pulley, and the gear assembly further comprises a first connection shaft. Moreover, two ends of the first connection shaft are fixed on the main body. The first connection shaft is penetrated through the first gear. A side of the supporting rod that is away from the roller is sheathed around the belt pulley. A side of the first connection shaft that is close to the roller is penetrated through the belt pulley. The roller and the first gear are connected with each other through the belt pulley and the first connection shaft. Preferably, the supporting shaft is located beside a first side of the belt pulley, and the first connection shaft is located beside a second side of the belt pulley. Preferably, the mouse further includes a roller sensor. The roller sensor is disposed within the main body. The roller sensor is located at a side of the supporting bracket that is away from the roller. An extension part is extended from the supporting shaft. The extension part is contacted with the roller sensor. Consequently, the time period of rotating the roller is also extended.

In an embodiment, the mouse further includes a circuit board and a roller sensor. The circuit board and the roller sensor are installed on the circuit board and electrically connected with the circuit board. Preferably, the encoding element is an encoder, and the roller sensor is a button sensor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
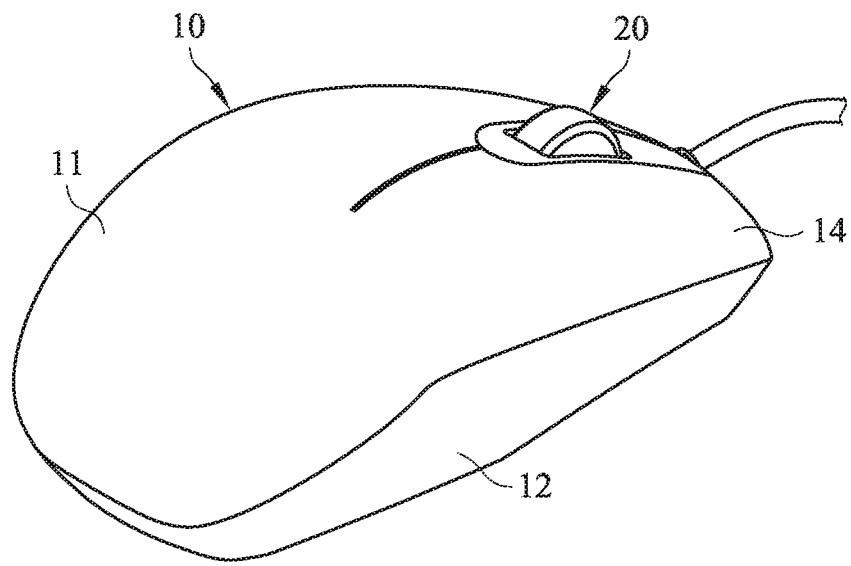
FIG. 1 is a schematic perspective view illustrating the outward appearance of a mouse with an inertial roller module according to a first embodiment of the present invention.
Figure 2:
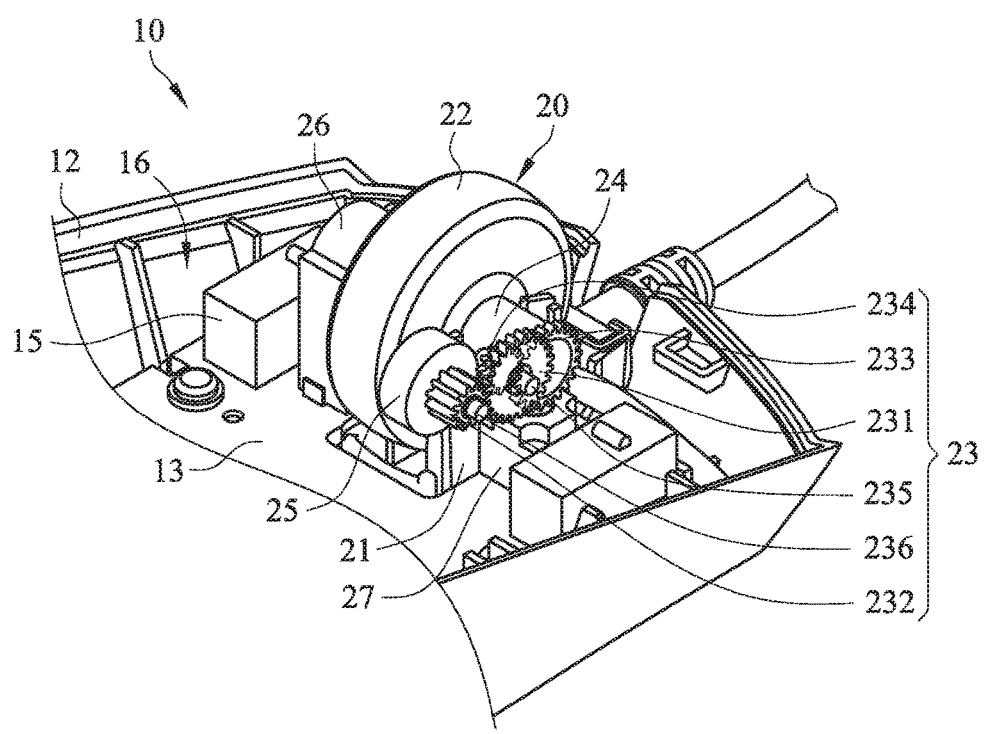
FIG. 2 is a schematic perspective view illustrating a portion of the mouse according to the first embodiment of the present invention.

FIG. 1 is a schematic perspective view illustrating the outward appearance of a mouse with an inertial roller module according to a first embodiment of the present invention. FIG. 2 is a schematic perspective view illustrating a portion of the mouse according to the first embodiment of the present invention. As shown in FIGS. 1 and 2, the mouse 100 comprises a main boy 10 and an inertial roller module 20.

The main body 10 comprises an upper cover 11, a lower cover 12, a circuit board 13, two buttons 14 and two button sensors 15. The upper cover 11 and the lower cover 12 are aligned with each other. When the upper cover 11 and the lower cover 12 are combined together, an accommodation space 16 is formed between the upper cover 11 and the lower cover 12. The circuit board 13 is disposed within the accommodation space 16 and fixed on the lower cover 12. The two buttons 14 are disposed on the upper cover 11. The two button sensors 15 are disposed within the accommodation space 16. The two button sensors 15 are fixed on the circuit board 13 and electrically connected with the circuit board 13. The two buttons 14 are connected with the two button sensors 15, respectively.

The inertial roller module 20 is installed in the accommodation space 16 of the main body 10. In an embodiment, the inertial roller module 20 comprises a supporting bracket 21, a roller 22, a gear assembly 23, a supporting shaft 24, an inertial rotator 25, an encoding element 26 and a roller sensor 27.

A bottom portion of the supporting bracket 21 is fixed on the lower cover 12. The roller 22 is located near a first side of the supporting bracket 21. The gear assembly 23 is located near a second side of the supporting bracket 21 that is away from the roller 22. That is, the supporting bracket 21 is arranged between the gear assembly 23 and the roller 22. The gear assembly 23 comprises a first gear 231, a second gear 232, a third gear 233 and a fourth gear 234, a first connection shaft 235 and a second connection shaft 236. A first side of the supporting shaft 24 is connected with the roller 22. A second side of the supporting shaft 24 is penetrated through the supporting bracket 21 and connected with the third gear 233. Consequently, the roller 22 is pivotally coupled to the supporting bracket 21 through the supporting shaft 24, and the third gear 233 is fixed on the supporting shaft 24. Moreover, while the roller 22 is rotated, the third gear 233 is rotated with the supporting shaft 24. The roller sensor 27 is installed on the circuit board 13 and electrically connected with the circuit board 13. The roller sensor 27 is located under the third gear 233. A gear surface of the third gear 233 is in contact with the roller sensor 27.

The two ends of the first connection shaft 235 are fixed on the upper cover 11 of the main body 10. The first connection shaft 235 is penetrated through the first gear 231 and the fourth gear 234. Moreover, the first gear 231 and the fourth gear 234 are fixed on the first connection shaft 235. Consequently, the first gear 231 and the fourth gear 234 are connected with each other through the first connection shaft 235. The fourth gear 234 is arranged between the supporting bracket 21 and the first gear 231. The third gear 233 and the fourth gear 234 are engaged with each other. Due to the engagement between the third gear 233 and the fourth gear 234, the roller 22 is connected with the first gear 231. Consequently, the rotation of the roller 22 drives rotation of the first gear 231 through the engagement between the third gear 233 and the fourth gear 234. In an embodiment, the number of teeth in the fourth gear 234 is smaller than the number of teeth in the first gear 231 and the number of teeth in the third gear 233.

The two ends of the second connection shaft 236 are fixed on the upper cover 11. The second connection shaft 236 is penetrated through the second gear 232 and the inertial rotator 25. Moreover, the second gear 232 and the inertial rotator 25 are fixed on the second connection shaft 236. Consequently, the second gear 232 and the inertial rotator 25 are connected with each other through the second connection shaft 236. The inertial rotator 25 is arranged between the second gear 232 and the roller 22. The first gear 231 and the second gear 232 are engaged with each other. Consequently, the motive power of the roller 22 can be transmitted to the inertial rotator 25 through the engagement between the first gear 231 and the second gear 232. The moment of inertial of the inertial rotator 25 drives the continuous rotation of the roller 22. In this embodiment, the number of teeth in the first gear 231 is larger than the number of teeth in the second gear 232.

The encoding element 26 is installed on the circuit board 13 and electrically connected with the circuit board 13. The encoding element 26 is located beside a side of the roller 22 that is away from the supporting bracket 21. Moreover, the encoding element 26 is connected with the roller 22. The encoding element 26 is an encoder. An example of the encoder includes but is not limited to a rotary encoder, an incremental optical encoder or an absolute optical encoder. The roller sensor 27 is a button sensor.

The operations of the inertial roller module 20 will be described as follows. Firstly, the roller 22 is rotated. As the roller 22 is rotated, the supporting shaft 24 is correspondingly rotated. Since the third gear 233 on the supporting shaft 24 is engaged with the fourth gear 234, the fourth gear 234 is correspondingly rotated. As the fourth gear 234 is rotated, the first gear 231 is rotated with the fourth gear 234 through the first connection shaft 235. Since the first gear 231 is engaged with the second gear 232, the second gear 232 is rotated with the first gear 231. As the second gear 232 is rotated, the inertial rotator 25 is correspondingly rotated with the second gear 232 through the second connection shaft 236. In other words, the motive power of the roller 22 is transmitted to the inertial rotator 25 through the third gear 233, the fourth gear 234, the first gear 231 and the second gear 232. The moment of inertial of the inertial rotator 25 drives the continuous rotation of the roller 22. Consequently, the time period of rotating the roller 22 is extended.

As mentioned above, the number of teeth in the third gear 233 is larger than the number of teeth in the fourth gear 234. Consequently, when the roller 22 is rotated, the rotation speed of the fourth gear 234 is faster than the rotation speed of the third gear 233. Under this circumstance, a first speed-increasing action is achieved. Since the first gear 231 is synchronously rotated with the fourth gear 234, the rotation speed of the first gear 231 is equal to the rotation speed of the fourth gear 234. As mentioned above, the number of teeth in the first gear 231 is larger than the number of teeth in the second gear 232. When the first gear 231 is engaged with the second gear 232 and the second gear 232 is rotated with the first gear 231, the rotation speed of the second gear 232 is faster than the rotation speed of the first gear 231. Under this circumstance, a second speed-increasing action is achieved. Since the inertial rotator 25 is synchronously rotated with the second gear 232, the rotation speed of the inertial rotator 25 is equal to the rotation speed of the second gear 232. In other words, the speed of the inertial rotator 25 is increased twice through the first gear 231, the second gear 232, the third gear 233 and the fourth gear 234. Generally, the moment of inertial of the inertial rotator 25 is in direct proportion to the rotation speed of the inertial rotator 25. Since the moment of inertial of the inertial rotator 25 is increased through the first gear 231, the second gear 232, the third gear 233 and the fourth gear 234, the time period of rotating the roller 22 is extended.

Moreover, the gear surface of the third gear 233 is in contact with the roller sensor 27. When the roller 22 is pressed down, the supporting shaft 24 is correspondingly moved downwardly. As the supporting shaft 24 is moved downwardly, the third gear 233 is moved downwardly to press the roller sensor 27. Under this circumstance, the roller 22 is also used as a button.

Figure 3:
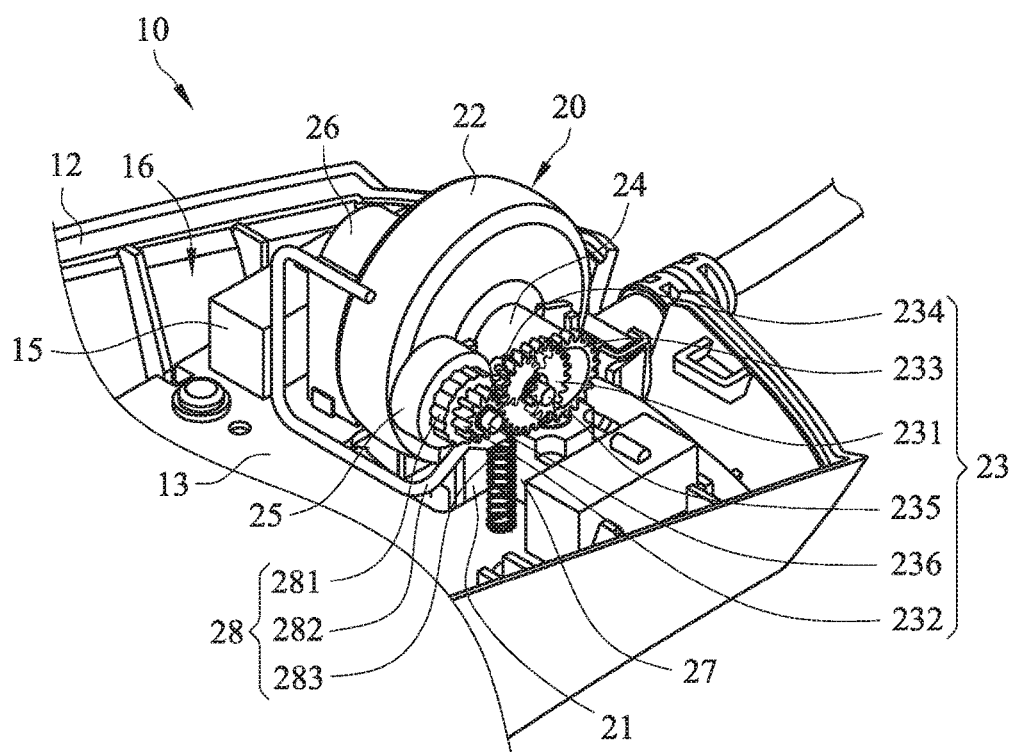
FIG. 3 is a schematic perspective view illustrating a portion of a mouse with an inertial roller module according to a second embodiment of the present invention.

FIG. 3 is a schematic perspective view illustrating a portion of a mouse with an inertial roller module according to a second embodiment of the present invention. In comparison with the first embodiment, the inertial roller module 20 of this embodiment further comprises a clicking-feel generation mechanism 28. The clicking-feel generation mechanism 28 comprises a ratchet 281, a press rod 282 and an elastic element 283. The second connection shaft 236 is penetrated through the ratchet 281. Consequently, the ratchet 281 is fixed on the second connection shaft 236. The ratchet 281 is arranged between the second gear 232 and the inertial rotator 25. The press rod 282 is located under the ratchet 281 and engaged with the ratchet 281. An end of the press rod 282 is pivotally coupled to the lower cover 12 of the main body 10. The elastic element 283 is located under the press rod 282. The end of the elastic element 283 that is away from the press rod 282 is fixed on the lower cover 12 of the main body 12. Consequently, the press rod 282 is contacted with the elastic element 283. For example, the elastic element 283 is a spring.

The ratchet 281 and the press rod 282 are engaged with each other. As the roller 22 is rotated, the ratchet 281 is rotated through the second connection shaft 236. When the press rod 282 is pushed by the gear surface of the ratchet 281, the press rod 282 is moved downwardly to compress the elastic element 283. As the ratchet 281 is rotated and the press rod 282 is arranged in the gap between two adjacent teeth of the ratchet 281, the press rod 282 is pushed upwardly by the elastic element 283. Consequently, the press rod 282 is moved upward and inserted into the gap between two adjacent teeth of the ratchet 281. As the roller 22 is rotated, the press rod 282 is alternately inserted into and removed from the gap between two adjacent teeth of the ratchet 281. Under this circumstance, the rotation of the roller 22 results in continuous clicking feel.

Figure 4:
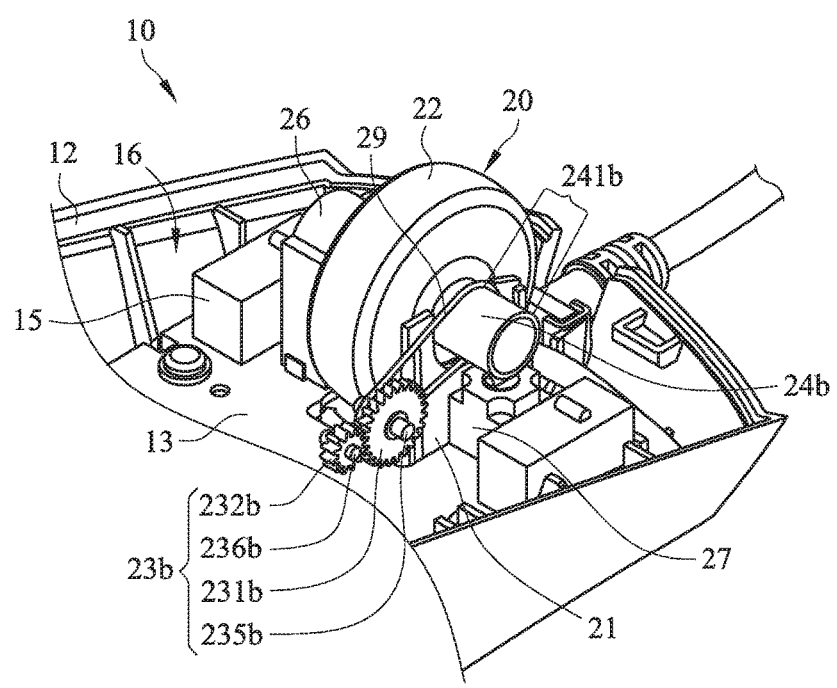
FIG. 4 is a schematic perspective view illustrating a portion of a mouse with an inertial roller module according to a third embodiment of the present invention.

FIG. 4 is a schematic perspective view illustrating a portion of a mouse with an inertial roller module according to a third embodiment of the present invention. In comparison with the first embodiment, the inertial roller module 20 of this embodiment further comprises a belt pulley 29, and the supporting shaft 24 and the gear assembly 23 are respectively replaced by a supporting shaft 24b and the gear assembly 23b.

A first side of the supporting shaft 24b is connected with the roller 22. A second side of the supporting shaft 24b is penetrated through the supporting bracket 21. Moreover, an extension part 241b is extended from the end of the supporting shaft 24b that is away from the roller 22. The extension part 241b is contacted with the roller sensor 27. A portion of the belt pulley 29 is sheathed around the side of the supporting shaft 24b that is away from the roller 22.

The gear assembly 23b comprises a first gear 231b, a second gear 232b, a first connection shaft 235b and a second connection shaft 236b. The two ends of the first connection shaft 235b are fixed on the upper cover 11. The first connection shaft 235b is penetrated through the first gear 231b. Moreover, the first gear 231b is fixed on the first connection shaft 235b. Consequently, the first gear 231b is rotated with the first connection shaft 235b. The side of the first connection shaft 235b that is close to the roller 22 is penetrated through the side of the belt pulley 29 that is away from the supporting shaft 24b. Consequently, the supporting shaft 24b is located beside a first side of the belt pulley 29, and the first connection shaft 235b is located beside a second side of the belt pulley 29. Under this circumstance, the roller 22 and the first gear 231b are connected with each other through the belt pulley 29 and the first connection shaft 235b. The two ends of the second connection shaft 236b are fixed on the upper cover 11. The second connection shaft 236b is penetrated through the second gear 232b. Moreover, the second gear 232b is fixed on the second connection shaft 236b. Consequently, the second gear 232b is rotated with the second connection shaft 236b. The first gear 231b and the second gear 232b are engaged with each other. In this embodiment, the number of teeth in the first gear 231b is larger than the number of teeth in the second gear 232b.

As the roller 22 is rotated, the supporting shaft 24b is correspondingly rotated with the roller 22. The belt pulley 29 is rotated with the supporting shaft 24b. Since the first connection shaft 235b is rotated with the belt pulley 29, the first gear 231b is correspondingly rotated. Since the first gear 231b is engaged with the second gear 232b, the second gear 232b is rotated with the first gear 231b. As the second gear 232b is rotated, the moment of inertial of the second gear 232b drives the continuous rotation of the roller 22.

As mentioned above, the number of teeth in the first gear 231b is larger than the number of teeth in the second gear 232b. That is, the rotation speed of the second gear 232b is faster than the rotation speed of the first gear 231b. Generally, the moment of inertial is in direct proportion to the rotation speed. Since the moment of inertial of the second gear 232b is larger than the moment of inertial of the first gear 231b, the moment of inertial of the second gear 232b is increased. Under this circumstance, the time period of rotating the roller 22 is extended.

From the above descriptions, the mouse of the present invention has the following features. Firstly, the moment of inertial of the inertial rotator 25 drives the continuous rotation of the roller 22, and thus the time period of rotating the roller 22 is extended. Secondly, the moment of inertial of the inertial rotator 25 is increased through the first gear 231, the second gear 232, the third gear 233 and the fourth gear 234, and thus the time period of rotating the roller 22 is extended. Thirdly, the gear surface of the third gear 233 is in contact with the roller sensor 27, and thus the roller 22 is also used as a button. Fourthly, the arrangements of the ratchet 281, the press rod 282 and the elastic element 283 results in continuous clicking feel when the roller 22 is rotated. Fifthly, the arrangements of the first gear 231b, the second gear 232b and the belt pulley 29 can also increase the time period of rotating the roller 22.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse with an inertial roller module, the mouse comprising:
    a main body; and
    the inertial roller module installed in the main body, and comprising:
        a supporting bracket fixed in the main body;
        a roller pivotally coupled to the supporting bracket;
        a gear assembly located beside a side of the supporting bracket that is away from the roller, wherein the gear assembly comprises a first gear and a second gear, the first gear is connected with the roller, the first gear is engaged with the second gear, and the number of teeth in the first gear is larger than the number of teeth in the second gear; and
        an encoding element located beside a side of the roller that is away from the supporting bracket, wherein the encoding element is connected with the roller;
    a supporting shaft, wherein a first side of the supporting shaft is connected with the roller, and a second side of the supporting shaft is penetrated through the supporting bracket and connected with the first gear, so that the roller is connected with the first gear through the supporting shaft, wherein the gear assembly further comprises a third gear and a fourth gear, wherein a side of the third gear is connected with an end of the supporting shaft that is away from the roller, the fourth gear is connected with the first gear and arranged between the supporting bracket and the first gear, and the roller is connected with the first gear through engagement between the third gear and the fourth gear.

2. The mouse according to claim 1, wherein the gear assembly further comprises a first connection shaft, wherein two ends of the first connection shaft are fixed on the main body, and the first connection shaft is penetrated through the first gear and the fourth gear, so that the first gear and the fourth gear are connected with each other through the first connection shaft.

3. The mouse according to claim 2, wherein the number of teeth in the fourth gear is smaller than the number of teeth in the first gear and the number of teeth in the third gear.

4. The mouse according to claim 1, wherein the inertial roller module further comprises a roller sensor, wherein the roller sensor is located under the third gear, and a gear surface of the third gear is in contact with the roller sensor.

5. The mouse according to claim 1, wherein the inertial roller module further comprises an inertial rotator, wherein the inertial rotator is arranged between the second gear and the roller, and the inertial rotator is connected with the second gear.

6. The mouse according to claim 5, wherein the gear assembly further comprises a second connection shaft, wherein two ends of the second connection shaft are fixed on the main body, and the second connection shaft is penetrated through the second gear and the inertial rotator, so that the second gear and the inertial rotator are connected with each other through the second connection shaft.

7. The mouse according to claim 6, wherein the inertial roller module further comprises a clicking-feel generation mechanism, and the clicking-feel generation mechanism comprises a ratchet, a press rod and an elastic element, wherein the second connection shaft is penetrated through the ratchet, the ratchet is arranged between the second gear and the inertial rotator, the press rod is located under the ratchet and engaged with the ratchet, an end of the press rod is pivotally coupled to the main body, the elastic element is located under the press rod, an end of the elastic element that is away from the press rod is fixed on the main body, and the press rod is contacted with the elastic element.

8. The mouse according to claim 4, further comprising a circuit board, wherein the circuit board is disposed within the main body, the circuit board and the roller sensor are installed on the circuit board and electrically connected with the circuit board, the encoding element is an encoder, and the roller sensor is a button sensor.

* * * * *